Figure 1:
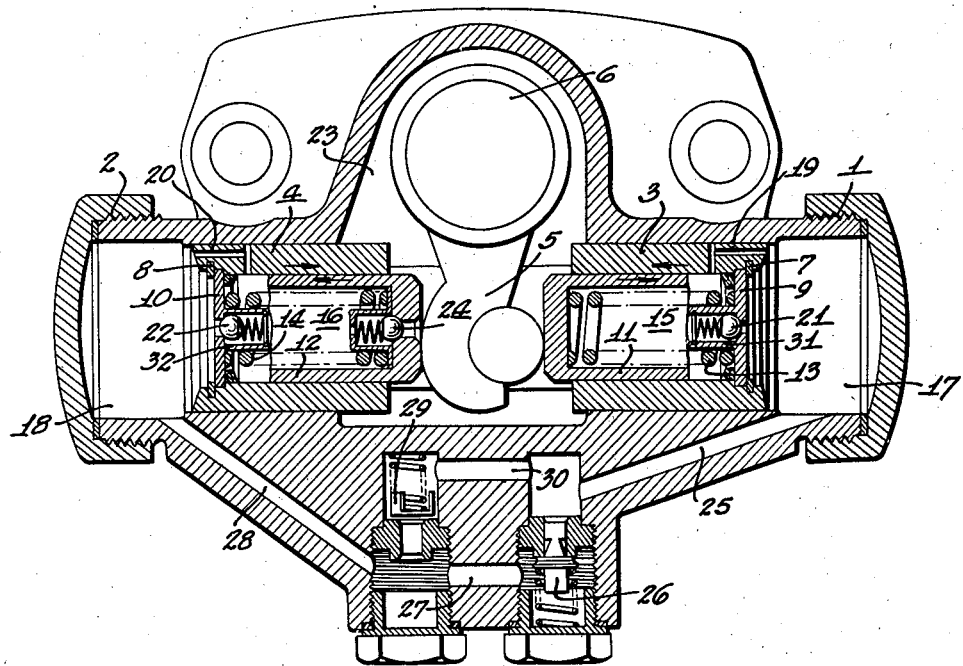

June 20, 1944. W. ZENZ 2,352,063

HYDRAULIC SHOCK ABSORBER

Filed Feb. 28, 1941

Inventor:
WILHELM ZENZ
By
Attorney.

Patented June 20, 1944

2,352,063

UNITED STATES PATENT OFFICE 2,352,063

HYDRAULIC SHOCK ABSORBER

Wilhelm Zenz, Wuppertal-Elberfeld, Germany; vested in the Alien Property Custodian Application February 28, 1941, Serial No. 381,164
In Germany July 3, 1930

12 Claims. (Cl. 188—88)

The present invention relates to a single acting or double acting hydraulic shock absorber particularly for deadening or dampening relative movements between the axis of a vehicle on the one hand and the chassis or underframe and the carriage body on the other hand. The invention consists in so constructing the shock absorber that it not only acts as absorber but over a certain range also as stabilizer without requiring the pipe connections between the absorber cylinders at the two ends of the axis used ordinarily in connection with hydraulic stabilizers. With the absorber according to the present invention a shock absorption is effected at the beginning in a first range of dampening, but on exceeding a certain amplitude, the vibrating motion is totally or nearly totally braked and only if a certain higher tension, exceeding the braking force, is again established between the carriage body and the axis, that is to say, in a second range of dampening a further absorption of the vibrations is effected.

To obtain this object a liquid filled hollow space is provided according to the invention in the absorber piston which hollow space is closed by a spring-loaded piston guided in the absorber piston, a throttling device for the liquid displaced from the hollow space being provided either at the absorber piston or at the small piston.

A substantial feature of the invention consists in this that the discharge opening for the liquid displaced from the hollow space as well as the suction opening by which liquid is admitted again to the hollow space if the small piston returns discharge into the pressure space of the absorber. Hereby the following substantial differences in action and advantages result:

With slow movement of the small piston, for instance if the vehicle takes a curve, the liquid displaced from the hollow space flows into the pressure space behind the absorber piston and here produces an overpressure which, however, is not yet sufficient to open the high pressure valve arranged between the high pressure side and the low pressure side of the absorber, but is capable of displacing the large piston in a direction opposite to the movement of the small piston so that the large piston moves towards the small piston. Consequently the small piston bears against the inner side of the bottom of the large piston earlier as would correspond to its normal stroke according to its starting position and the stabilizing begins earlier about this section of the stroke performed by the large piston which is very desirable. At fast movement of the small piston, however, the liquid from the hollow space between the pistons is supplied with a jerk into the high pressure space and the high pressure valve is forced open by the high pressure suddenly occurring, whereby the large piston, due to its mass inertia, remains absolutely immovable. Between these two extreme possibilities explained a large number of intermediate steps are possible in which the large piston is moved towards the small piston as well as the high pressure valve is opened already.

The shock absorber according to the invention, therefore, has the advantage that the second range of dampening automatically begins in dependence on the velocity of the movement to be dampened, i. e. an automatic control of the beginning and of the duration of the individual steps is obtained.

A further advantage of the shock absorber according to the invention consists in this that by drawing the liquid out of the pressure space of the shock absorber the danger is obviated that air reaches the hollow space which otherwise by drawing liquid from a space chamber, easily may occur, for instance due to heavy vibrations of the vehicle or at low liquid level. The total device therefore operates absolutely with largest uniformity and reliability.

Figure 2:
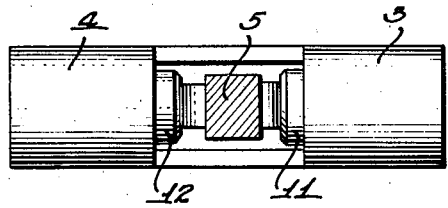

Further details of the invention may be seen from the following specification given by way of the accompanying drawing which shows one modification of the invention in a longitudinal section. Fig. 1 is a longitudinal central sectional view through a shock absorber embodying my invention, and Fig. 2 is a detail elevation of the piston structure, taken substantially on the line 2—2 of Fig. 1, looking in the direction of the arrows.

The shock absorber consists of two cylinders, the high pressure cylinder 1 and the low pressure cylinder 2 with pistons 3 and 4 respectively, the pistons 3 and 4 being connected for movement as a unit. In the pistons 3 and 4 which consist of cylindrical sleeves with inserted bottoms 9 and 10 respectively held by retaining rings 7 and 8 respectively smaller piston 11 and 12 respectively are guided which bear against the piston bottoms 9 and 10 by springs 13 and 14 respectively. A cam lever 5 on the operating shaft 6 engages pistons 11 and 12 to displace the latter and thereby to effect displacement of pistons 3 and 4 as described. The hollow spaces 15 and 16 formed between the large pistons and the small pistons are connected to the high pressure space 17 and the low pressure space 18 respectively by a passage 19 and 20 respectively and the suction valves 21 and 22 (snifting valves) respectively. The valves 21 and 22 preferably are arranged in the exchangeable piston bottoms 9 and 10 respectively. To compensate for a liquid loss eventually occurring in the system, a suction valve 24 (snifting valve) leading to a spare chamber 23 is provided in the bottom of the piston 12. The passages 19 and 20 generally consist of smooth bores the diameter of which is from the beginning adapted to the weight of the vehicle and to the force acting upon the shock absorber respectively.

The high pressure space 17 is connected by way of a passage 25 to the high pressure valve 26 which discharges into a passage 27, 28 leading to the low pressure space 18. On the other hand the low pressure valve 29 connected to the passage 28 discharges by way of the bore 30 into the passage 25. The just described device acts in such a manner that at slow movements of the cam lever the pistons 3 and 4 move towards the pistons 11 and 12 respectively as indicated in the drawing by arrows. At fast movements of the pistons 11 and 12, however, the pistons 3 and 4 remain at rest and the liquid discharged from the spaces 15 and 16 by way of the passages 19 and 20 respectively produces in the spaces 17 and 18 such a pressure that the valves 26 and 29 are opened and thereby the liquid flows from the high pressure side to the low pressure side and vice versa respectively.

The movement of the pistons 11 and 12 relatively to the pistons 3 and 4 respectively is completed as soon as the pistons 11 and 12 have covered the mouths of the passages 19 or 20 respectively.

As may be seen from the drawing, the valve casings 31, 32 arranged at the exchangeable piston bottoms 9 and 10 respectively form a guide for the springs 13 and 14.

What I claim is:

1. An hydraulic shock absorber, comprising two cylinders, an absorber piston in each of said cylinders, a liquid filled hollow space in each of said absorber pistons closed by a spring-loaded piston guided in said absorber piston, and a throttling device for the liquid discharged from said hollow space provided at one of said pistons, said throttling device discharging into the pressure space of the shock absorber.

2. An hydraulic shock absorber, comprising two cylinders, an absorber piston in each of said cylinders, a liquid filled hollow space in each of said absorber pistons closed by a spring-loaded piston guided in said absorber piston, a throttling device for the liquid discharged from said hollow space provided at one of said pistons and a snifting valve for drawing liquid into the hollow space between the two pistons, said throttling device as well as said snifting valve communicating with the pressure space of the shock absorber.

3. An hydraulic shock absorber as set forth in claim 2 in which the throttling opening for the liquid displaced from the hollow space consists of a smooth passage provided in the wall of said absorber piston.

4. An hydraulic shock absorber as set forth in claim 1 in which each of the absorber pistons consists of a cylindrical sleeve and an insertable piston bottom.

5. An hydraulic shock absorber as set forth in claim 2 in which each of the absorber pistons consists of a cylindrical sleeve and an insertable piston bottom.

6. An hydraulic shock absorber as set forth in claim 1 in which each of the absorber pistons consists of a cylindrical sleeve and an insertable piston bottom, each of said insertable piston bottoms simultaneously forming a casing for said snifting valves.

7. An hydraulic shock absorber as set forth in claim 2 in which each of the absorber pistons consists of a cylindrical sleeve and in insertable piston bottom, each of said insertable piston bottoms simultaneously forming a casing for said snifting valves.

8. An hydraulic shock absorber as set forth in claim 1 in which each of the absorber pistons consists of a cylindrical sleeve and an insertable piston bottom, each of said insertable piston bottoms simultaneously forming a casing for said snifting valves and each of said valve casings forming a guide for the springs loading the pistons.

9. An hydraulic shock absorber as set forth in claim 2 in which each of the absorber pistons consists of a cylindrical sleeve and an insertable piston bottom, each of said insertable piston bottoms simultaneously forming a casing for said snifting valves, and each of said valve casings forming a guide for the springs loading the pistons.

10. An hydraulic shock absorber, comprising two cylinders, an absorber piston in each of said cylinders, a liquid filled hollow space in each of said absorber pistons closed by a spring-loaded piston guided in said absorber piston, a throttling device for the liquid discharged from said hollow space provided at one of said pistons and a snifting valve for drawing liquid into the hollow space between the two pistons, each of the absorber pistons consisting of a cylindrical sleeve and an insertable piston bottom.

11. An hydraulic shock absorber, comprising two cylinders, an absorber piston in each of said cylinders, a liquid filled hollow space in each of said absorber pistons closed by a spring-loaded piston guided in said absorber piston, a throttling device for the liquid discharged from said hollow space provided at one of said pistons and a snifting valve for drawing liquid into the hollow space between the two pistons, each of the absorber pistons consisting of a cylindrical sleeve and an insertable piston bottom, each of said insertable piston bottoms simultaneously forming a casing for said snifting valves.

12. An hydraulic shock absorber, comprising two cylinders, an absorber piston in each of said cylinders, a liquid filled hollow space in each of said absorber pistons closed by a spring-loaded piston guided in said absorber piston, a throttling device for the liquid discharged from said hollow space provided at one of said pistons and a snifting valve for drawing liquid into the hollow space between the two pistons, each of the absorber pistons consisting of a cylindrical sleeve and an insertable piston bottom, each of said insertable piston bottoms simultaneously forming a casing for said snifting valves, and each of said valve casings forming a guide for the springs loading the pistons.

WILHELM ZENZ.